(12) United States Patent
Miller et al.

(10) Patent No.: US 9,047,125 B2
(45) Date of Patent: Jun. 2, 2015

(54) DETERMINISTIC REAL TIME BUSINESS APPLICATION PROCESSING IN A SERVICE-ORIENTED ARCHITECTURE

(75) Inventors: Landon C. Miller, Tuscaloosa, AL (US); Siljan H. Simpson, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 1560 days.

(21) Appl. No.: 12/146,984

(22) Filed: Jun. 26, 2008

(65) Prior Publication Data

US 2009/0328039 A1    Dec. 31, 2009

(51) Int. Cl.
- G06F 9/30 (2006.01)
- G06F 9/50 (2006.01)
- G06F 9/48 (2006.01)

(52) U.S. Cl.
CPC ............ G06F 9/5038 (2013.01); G06F 9/4843 (2013.01); G06F 2209/506 (2013.01)

(58) Field of Classification Search
None
See application file for complete search history.

(56) References Cited

U.S. PATENT DOCUMENTS

| | | | | |
|---|---|---|---|---|
| 5,838,968 A | * | 11/1998 | Culbert | 718/104 |
| 2002/0031086 A1 | * | 3/2002 | Welin | 370/229 |
| 2004/0100982 A1 | * | 5/2004 | Balasubramanian | 370/429 |
| 2006/0143031 A1 | * | 6/2006 | Bou-Ghannam et al. | 705/1 |
| 2006/0143229 A1 | * | 6/2006 | Bou-Ghannam et al. | 707/104.1 |
| 2008/0312778 A1 | * | 12/2008 | Correa et al. | 701/3 |

* cited by examiner

*Primary Examiner* — William B Partridge
(74) *Attorney, Agent, or Firm* — Edward J. Lenart; John R. Pivnichny; Kennedy Lenart Spraggins LLP

(57) ABSTRACT

Methods, apparatus, and products for deterministic real time business application processing in a service-oriented architecture ('SOA'), the SOA including SOA services, each SOA service carrying out a processing step of the business application where each SOA service is a real time process executable on a real time operating system of a generally programmable computer and deterministic real time business application processing according to embodiments of the present invention includes configuring the business application with real time processing information and executing the business application in the SOA in accordance with the real time processing information.

13 Claims, 4 Drawing Sheets

DETERMINISTIC REAL TIME BUSINESS APPLICATION PROCESSING IN A SERVICE-ORIENTED ARCHITECTURE

BACKGROUND OF THE INVENTION

1. Field of the Invention

The field of the invention is data processing, or, more specifically, methods, apparatus, and products for deterministic real time business application processing in a service-oriented architecture ('SOA').

2. Description of Related Art

The development of the Electronic Discrete Variable Automatic Computer (EDVAC) computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Current computers are capable of running operating systems of different types. One such type of operating system becoming more prevalent in current computers are real time operating systems. Real time operating systems guarantee a certain capability within a specified time constraint. The use of real time operating systems in service-oriented architectures and business processes executed in such service oriented architectures, however, is currently lacking. In fact, in today's service-oriented architectures, there is currently no approach to the execution of a Business Process Execution Language (BPEL), semantic network, or other workflow driven business application in deterministic real time.

SUMMARY OF THE INVENTION

Methods, apparatus, and products for deterministic real time business application processing in a service-oriented architecture ('SOA'), the SOA including SOA services, each SOA service carrying out a processing step of the business application where each SOA service is a real time process executable on a real time operating system of a generally programmable computer and deterministic real time business application processing according to embodiments of the present invention includes configuring the business application with real time processing information and executing the business application in the SOA in accordance with the real time processing information.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
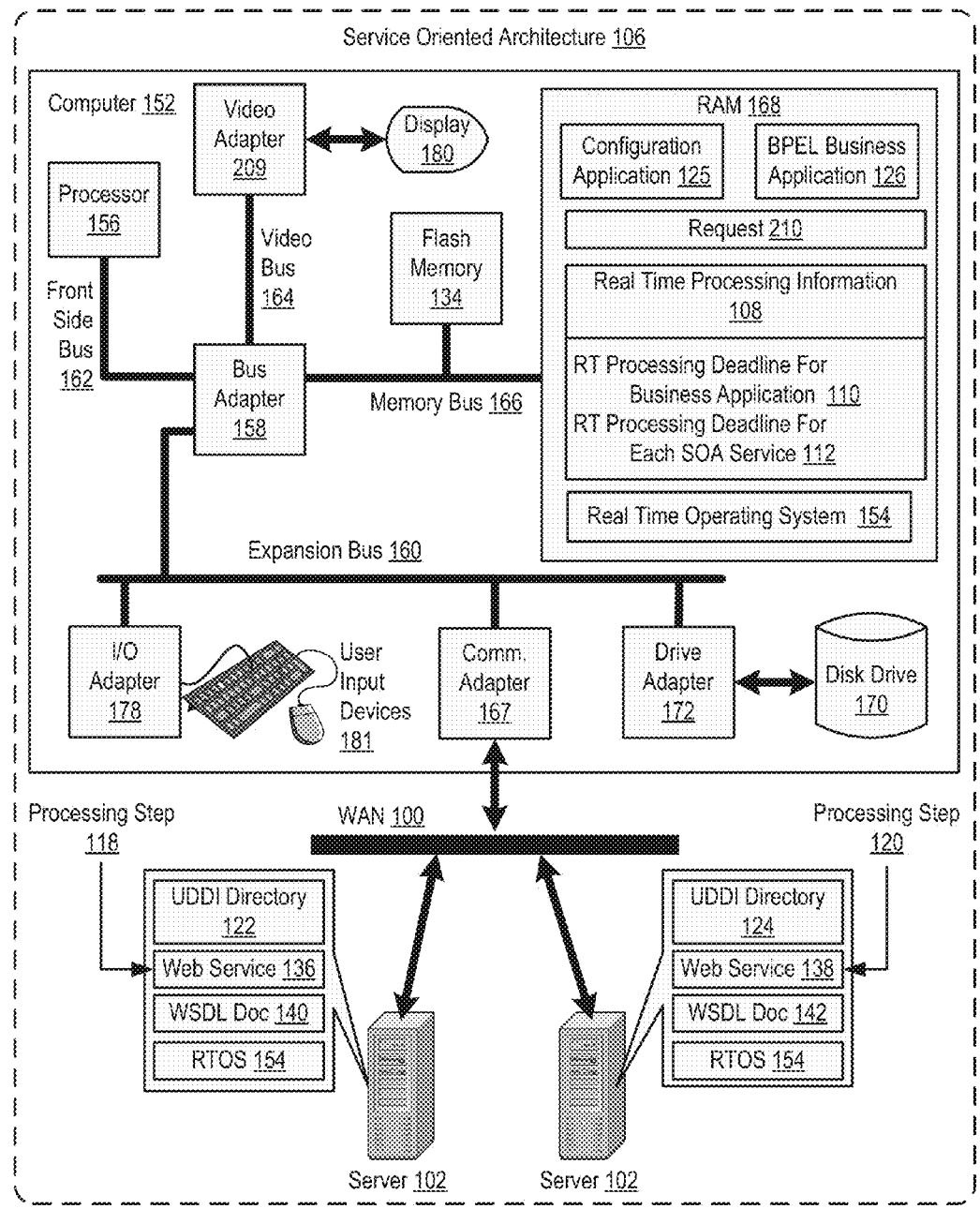
FIG. 1 sets forth a functional block diagram of an exemplary system for deterministic real time business application processing in an SOA according to embodiments of the present invention.

Exemplary methods, apparatus, and products for deterministic real time business application processing in a service-oriented architecture ('SOA') in accordance with the present invention are described with reference to the accompanying drawings, beginning with FIG. 1. FIG. 1 sets forth a functional block diagram of an exemplary system for deterministic real time business application processing in an SOA (106) according to embodiments of the present invention. SOA is a software architecture in which functionality is grouped around business processes and packaged as interoperable services. SOA may also describe an Information Technology ('IT') infrastructure which allows different applications to exchange data with one another as the applications participate in business processes. The focus of SOA is a loose coupling of services with operating systems, programming languages and other technologies which support software applications. SOA separates functions into distinct units, or services, which are made accessible over a data communications network (100) such that the services may be combined and reused in the production of business applications. These services communicate with each other by passing data from one service to another, or by coordinating an activity between two or more services. SOA concepts are often seen as built upon, and evolving from older concepts of distributed computing and modular programming.

The SOA of FIG. 1 includes two SOA services, implemented here as a pair of interoperable web services (136, 138). An SOA service is a module of computer program instructions, implemented in a service-oriented architecture with other services, which when executed provides a well-defined service. Each SOA service (136, 138) in the example of FIG. 1 is a real time process executable on a real time operating system of a generally programmable computer, such as the computer (152) or servers (102). The SOA services are configured to provide business information, that is, output data of the execution of the service, to a subsequent service, a service carrying out a subsequent processing step of the business application.

A real time operating system ('RTOS') is a multitasking operating system intended for real-time applications. Examples of such real-time applications may include embedded systems (e.g., programmable thermostats, household appliance controllers, mobile telephones), industrial robots, spacecraft, industrial control, scientific research equipment, and business applications processed in an SOA in accordance with embodiments of the present invention. The computer (152) of FIG. 1, and each server (102) hosting a web service (136, 138) is running an RTOS. An RTOS useful for deterministic real time business application processing in an SOA according to embodiments of the present invention include any operating system in having real time capabilities such as RTLinux™, VxWorks™, Microsoft Windows CE™, IBM Transaction Processing Facility™, and others as will occur to those of skill in the art.

In many real time operating systems, a process may be in one of three states from the perspective of the operating system: running, ready, or blocked. Most processes are blocked, most of the time. Only one process per processor or hardware thread is running. In some systems, the ready list is usually short, two or three tasks at most.

An RTOS does not necessarily have high throughput, but rather, an RTOS provides facilities which may guarantee real time deadlines can be met generally (soft real-time) or deterministically (hard real-time). An RTOS is valued more for how quickly and predictably it can respond to a particular event rather than for the given amount of work it can perform over time. Key factors in an RTOS are therefore a minimal interrupt latency and a minimal thread switching latency.

RTOS may be event driven or time-sharing in executing processes. Event-driven, or priority scheduling, real time operating systems switch processes only when an event of higher priority needs service, called pre-emptive priority. Time-sharing real time operating systems switch processes on a clock interrupt, and on events, called round robin. Time-sharing operating systems switch processes more often than is strictly necessary, but result in smoother, more deterministic multitasking, giving the illusion that a process has sole use of a machine.

A scheduler in the RTOS schedules execution of the processes according to a scheduling algorithm. An RTOS may employ one of many scheduling algorithms in order to execute processes in deterministic real time. Examples of scheduling algorithms used to execute such processes in real time include round-robin scheduling, fixed priority preemptive scheduling, preemptive time slicing, earliest deadline first, and others as will occur to those of skill in the art.

Round-robin scheduling is an algorithm used to schedule execution of processes in a real time operating system which assigns time slices to each process in equal portions and in order, handling all processes without priority. Round-robin scheduling is both simple and easy to implement, and starvation-free. Starvation is a problem in which a process is perpetually denied resources necessary for completion of the process.

Fixed priority preemptive scheduling is an algorithm used to schedule execution of processes in a real time operating system which uses a preemptive scheduler to ensure that at any given time, the processor executes the highest priority process of all those processes that are currently ready to execute. The preemptive scheduler has a clock interrupt task that provides the scheduler with an option to switch execution to another process after a time slice. This algorithm reduces starvation issues by providing resources to a particular process no longer than the time slice if so determined by the scheduler.

Earliest deadline first ('EDF') is an algorithm used to dynamically schedule execution of processes in a real time operating system which processes are placed in a priority queue. Upon a scheduling event, such as a completion of another process, a release of another process from the queue, and the like, the queue will be searched for the process closest to its deadline. This process will then be scheduled for execution next. EDF is an optimal scheduling algorithm on pre-emptive processors in the following sense: if a collection of independent jobs, each characterized by an arrival time, an execution requirement, and a deadline, can be scheduled, by any algorithm, such that all the jobs complete by their deadlines, the EDF will schedule this collection of jobs such that they all complete by their deadlines.

As mentioned above, the SOA services in the example of FIG. 1 are implemented as a pair of web services (136, 138). A web service is defined by the World Wide Web Consortium ('W3C') as "a software system designed to support interoperable Machine to Machine interaction over a network." Web services are frequently web application program interfaces ('APIs') that can be accessed over a data communications network (100), such as the Internet, and executed on a remote system hosting the requested services such as a server (102). The W3C web service definition encompasses many different systems, but in common usage the term refers to clients and servers that communicate using Extensible Markup Language ('XML') messages that follow the Simple Object Access Protocol ('SOAP') standard.

The example web services (136, 138) in the system of FIG. 1 are described in web services description language ('WSDL') in a WSDL document (140, 142). WSDL is an XML-based language that provides a model for describing web services. A WSDL document describes web services as collections of network endpoints, or ports. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the operations and messages are then bound to a concrete network protocol and message format. In this way, WSDL documents describe a public interface to the web service.

WSDL is often used in combination with SOAP and XML schema to provide web services over the Internet. A client program connecting to a web service can read the WSDL document to determine services that are available on the server. Any special datatypes used by the service are described in the WSDL document in the form of an XML schema. The client can then use SOAP to actually execute one of the services listed in the WSDL document.

Each web service (136, 138) in the example of FIG. 1 is also registered in at least one Universal Description, Discovery and Integration ('UDDI') directory (122, 124). A UDDI directory is a platform-independent, XML-based registry for businesses worldwide to list services provided by the business on the Internet. UDDI is an open industry initiative, sponsored by the Organization for the Advancement of Structured Information Standards (OASIS), enabling businesses to publish service listings and discover each other and define how the services or software applications interact over the Internet.

The web services (136, 138) in the example of FIG. 1 are described in WSDL in a WSDL document and registered in and UDDI directory for clarity only. Readers of skill in the art will immediately recognize that web services useful as SOA services that carry out processing steps of a business application in real time according to embodiments of the present invention may be described in descriptive languages other than WSDL and may be registered in directories other than UDDI directories.

In the example of FIG. 1, each SOA service (136, 138) carries out a processing step (118, 120) of the business application. A business application as the term is used in this specification refers to software application that provides business functionality. Examples of business applications include applications that process customer orders, travel planning applications that purchase plane tickets, hotel rooms, reserve rental cars, and the others as will occur to those of skill in the art.

The system of FIG. 1 includes a computer (152) connected for data communications to other computers through a wide area network (100). The computer (152) of FIG. 1 includes at least one computer processor (156) or central processing unit ('CPU') as well as random access memory (168) ('RAM') which is connected through a high speed memory bus (166) and bus adapter (158) to processor (156) and to other components of the computer (152). Stored in RAM (168) is a configuration application (125) and a BPEL business application (126).

A BPEL business application (126) is a business application as described above generated in business process execution language ('BPEL') by a BPEL engine. BPEL is a language for specifying business process behavior based on Web Services. A business process or business method is a collection of interrelated tasks which accomplish a particular goal. In the example of FIG. 1, any of the BPEL business application (126) and the web services (136, 148) may implement a business process because each service and the application may be described as a collection of interrelated tasks which accomplish a particular goal.

Business processes can be described in two ways in BPEL, as executable business processes or abstract business processes. Executable business processes model actual behavior of a participant in a business interaction. Abstract business processes are partially specified processes that are not intended to be executed. An abstract process may hide some concrete operational details. Abstract processes serve a descriptive role, with more than one possible use case, including observable behavior and process template. BPEL is meant to be used to model the behavior of both executable and abstract processes. A BPEL engine may generate an executable application in dependence upon such a BPEL description of the business process.

The business application (126) of FIG. 1 is implemented with BPEL for clarity of explanation only. Readers of skill in the art will recognize that in addition to BPEL, SOA services and business applications (126) according to embodiments of the present invention, may be implemented in other ways such as, for example, with a business rules engine, with semantic networking, and the like.

The configuration application (125) operates generally for deterministic real time business application processing in an SOA according to embodiments of the present invention. The configuration application (125) is a module of computer program instructions capable of configuring the business application (126) with real time processing information (108). Configuring the business application (126) with real time processing information (108) may be carried out by recording in metadata describing the business application a real time processing deadline for the business application (110), a real time processing deadline for each SOA service (112), and the like. A real time processing deadline (110) for the business application (126), for example, may specify that the business application (126), once executed, must be completed in 1.5 seconds. A real time processing deadline (112) for each processing step (118, 120), for example, may specify that a first processing step must be completed in 200 milliseconds, a second processing step must be completed in 250 milliseconds, and the like. Such processing deadlines for each processing step may be predefined, predetermined, dynamically calculated during execution of the business application and may be implemented in other ways as will occur to those of skill in the art.

The computer (152), including the real time operating system (154), in the example of FIG. 1 executes the BPEL business application (126) stored in RAM (168) in the SOA (106) in real time in accordance with the real time processing information (108). Once executed the business application (126) may provide the real time processing information (108) to the real time operating system (154) at run time as metadata. That is, upon execution of the business application, the RTOS may scan the metadata provided by the business application for the real time processing deadlines included in the real time processing information (108) and scheduling execution of the business application or a processing step in accordance with such metadata. The metadata may be implemented as an XML document, as a string in the computer program instructions of the business application, as an array stored in a memory location referenced by the application or in other ways as will occur to those of skill in the art.

Executing the BPEL business application (126) stored in RAM (168) in the SOA (106) in real time in accordance with the real time processing information (108) may include preempting by the real time operating system (154) processing of the business application (126) for a higher priority process only if execution of the business application (126) can be completed in accordance with the real time processing information (108), specifically the real time deadline for the business application (110). If the configuration application (125) configures the business application (126) with a real time processing deadline for each service, executing the BPEL business application (126) in the SOA (106) in deterministic real time may include preempting by the real time operating system (154) processing of an SOA service (136, 138) of the business application for a higher priority process only if execution of the SOA service can be completed in accordance with the real time processing information (108).

Executing the business application may also include sending requests (210) for data processing among the services. The requests (210) in the example of FIG. 1 may be sent among the services in a message, the structure, content, and semantics of which are defined by a message schema. Such a request message may be implemented with Extensible Markup Language ('XML'), HyperText Markup Language ('HTML'), another markup language, or in other ways as will occur to those of skill in the art. The request messages sent among the web services (136,138) in the example of FIG. 1 may be sent as SOAP requests for real time execution of a processing step of the business application, that is, as data communications messages transmitted in accordance with SOAP protocol.

Each such request (210) may include an identification of a next type of web service to call for a next processing step of the business application. When the requests include such an identification of a next type of web service (136, 138) to call, executing the business application may also include looking up in an UDDI directory (122, 124) the next type of web service for the next processing step in the business application.

Consider as an example, that the web service (136) is configured with a real time processing deadline of 500 milliseconds for the business application and receives a SOAP request for real time execution of a processing step of the business application (126). Upon receipt of the request, the real time operating system ('RTOS') (154) on which the web service runs, executes the requested web service, the web service provides in metadata, the real time processing deadline, and the RTOS assigns the service a priority such that the processing deadline is met. Assigning the service priority such that the processing deadline is met may include inserting the process into the ready list by a scheduler of the real time operating system (154) according to any of the previously mentioned scheduling algorithms. During execution of the scheduled service, the RTOS preempts processing of the service for a higher priority process only if execution of the service can be completed in accordance within 500 milliseconds, the real time processing deadline.

The RTOS (154), configuration application (125), and BPEL business application (126) in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that process business applications in deterministic real time in an SOA according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the servers (102). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for deterministic real time business application processing in an SOA according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
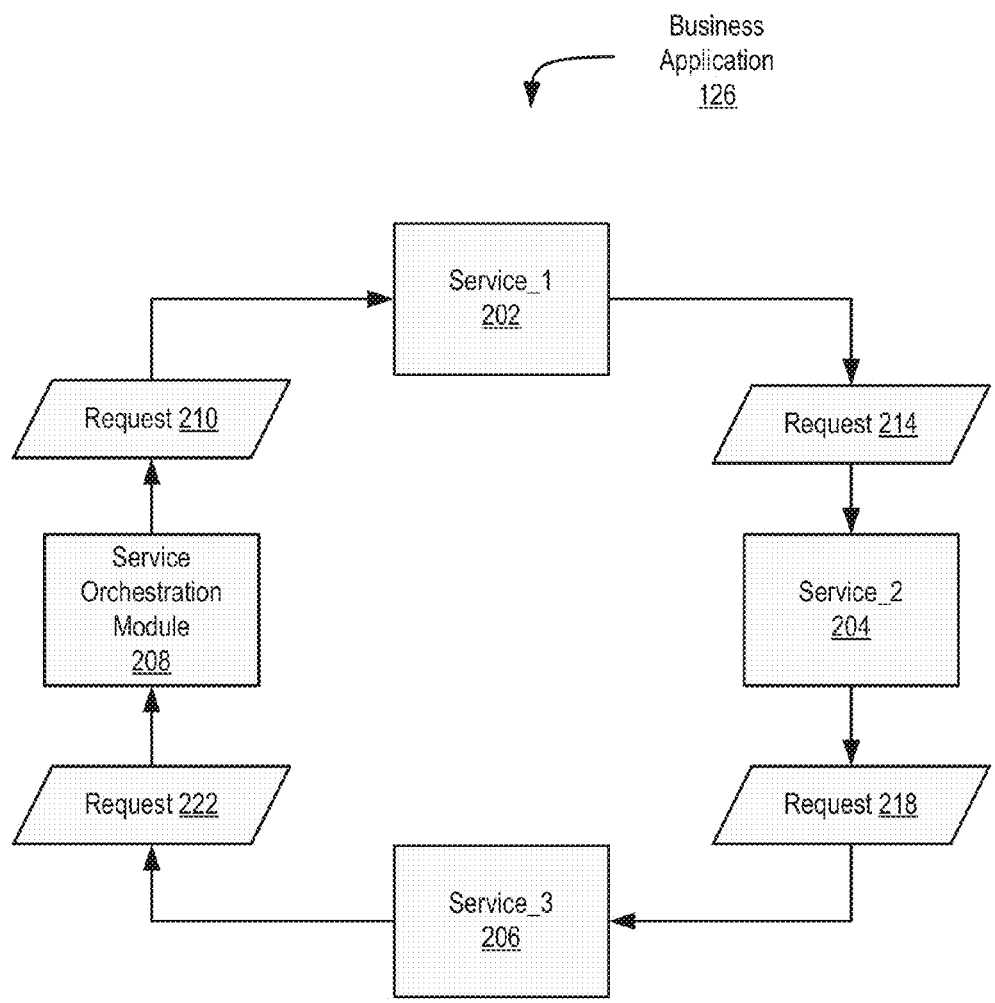
FIG. 2 sets forth a block diagram illustrating an exemplary business application processed in deterministic real time in an SOA in accordance with embodiments of the present invention.

For further explanation, FIG. 2 sets forth a block diagram illustrating an exemplary business application (126) processed in deterministic real time in an SOA in accordance with embodiments of the present invention. The business application in the example of FIG. 2 is configured with real time processing information. The business application in the example of FIG. 2 includes three SOA services, service_1 (202), service_2 (204), and service_3 (206). Each service in the example of FIG. 2 carries out one processing step of the business application (126). Each service is a real time process executable on a real time operating system of a generally programmable computer.

The business application (126) also includes a service orchestration module (208), a module of computer program instructions capable of initiating a first processing step of the business application (126) and terminating the business application upon completion of all business processing steps of the business application. In the example of FIG. 2, the application provides, at run time, the real time processing information to the real time operating system. Such real time processing information may be a real time processing deadline for the business application or a real time processing deadline for each SOA service (202, 204, 206) of the business application (126). The service orchestration module (208) sends a request (210) to service_1 (202) for data processing.

Consider as an example, that the real time processing information is a real time processing deadline for the business application of 1.5 seconds. A real time operating system executes the business application (126) in deterministic real time in accordance with the real time processing deadline. That is, the RTOS may schedule service_1 service_2, and service_3 such that all services will complete within the 1.5 seconds. In executing the business application (126), the RTOS may preempt processing of the business application for a higher priority process only if execution of the business application can be completed in accordance with the real time processing information, that is, in 1.5 seconds. A process having a higher priority than the service, as described above is a process having a shorter real time processing deadline that that of the service.

Consider another example in which each SOA service (202, 204, 206) in the example of FIG. 2 is configured with a real time processing deadline. A real time operating system executes each service (202, 204, 206), upon receiving a request (210) for data processing, in deterministic real time in accordance with the real time processing deadline each service is configured with. Consider, for example, that service_1 (202) is configured with a real time processing deadline of 500 milliseconds, service_2 (204) is configured with a real time processing deadline of 200 milliseconds, and service_3 (206) is configured with a real time processing deadline of 300 milliseconds. An RTOS may schedule service_1 (202) such that the service is completed within 500 milliseconds, service_2 (204) such that the service is completed within 200 milliseconds, and service_3 (206) such that the service is completed within 300 milliseconds. In executing any one of the services (202, 204, 206) an RTOS may preempt processing of the service for a higher priority process only if execution of the service can be completed in accordance with the real time processing information.

Figure 3:
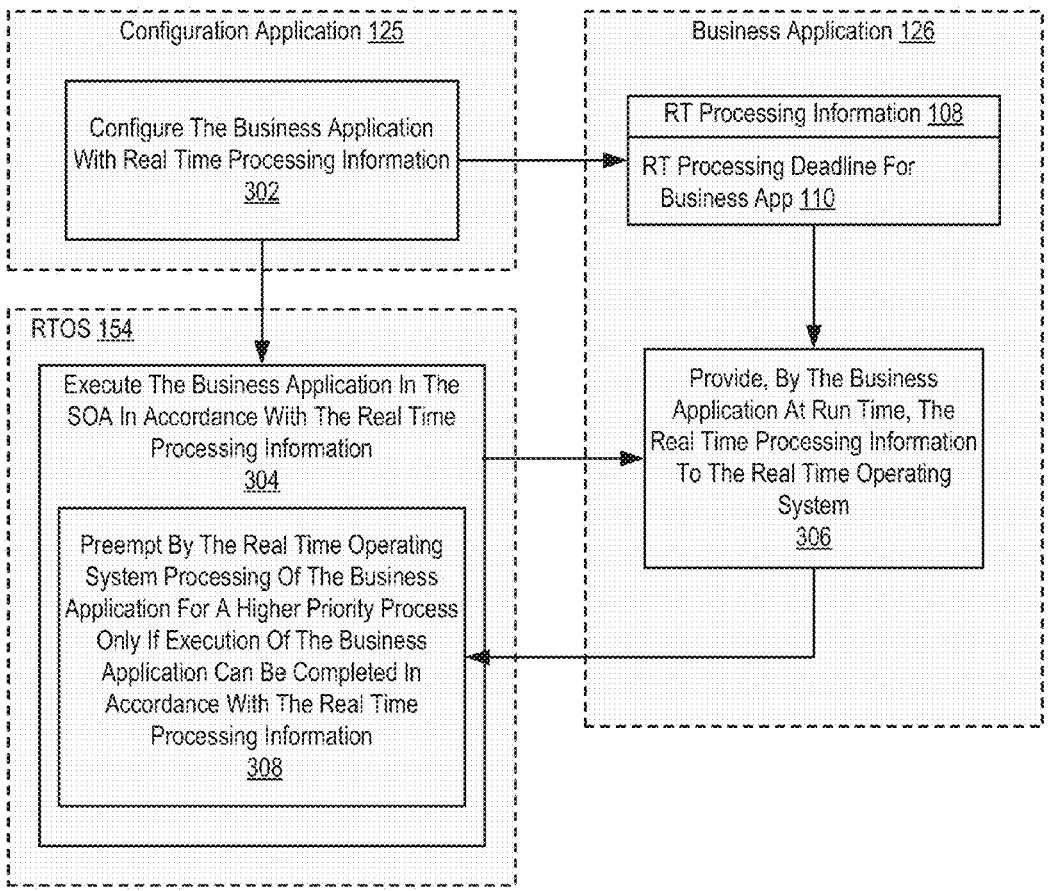
FIG. 3 sets forth a flow chart illustrating an exemplary method for deterministic real time business application processing in an SOA according to embodiments of the present invention.

For further explanation, FIG. 3 sets forth a flow chart illustrating an exemplary method for deterministic real time business application processing in an SOA according to embodiments of the present invention. The SOA in the method of FIG. 3 is similar to the SOA (106) in the example of FIG. 1, including as it does SOA services (136, 138 on FIG. 1) with each SOA service carrying out a processing step (118, 120 on FIG. 1) of the business application (126). Each SOA service (136, 138 on FIG. 1) is a real time process executable on a real time operating system (154) of a generally programmable computer (152 on FIG. 1).

The method of FIG. 3 includes configuring (302) the business application (126) with real time processing information (108). In the method of FIG. 3, the real time processing information (108) includes a real time processing deadline (110) for the business application. Configuring (302) the business application (126) with real time processing information (108) may be carried out by recording, by a configuration application (125), the real time processing information in metadata associated with the business application (126) or in other ways as will occur to readers of skill in the art.

The method of FIG. 3 also includes executing (304) the business application (126) in the SOA in accordance with the real time processing information and providing (306), by the business application (126) at run time, the real time processing information (108) to the real time operating system. Executing (304) the business application (126) in the SOA in accordance with the real time processing information may include assigning by a scheduler of the RTOS (154) the business application priority such that the real time processing deadline (110) for the application is met. Assigning the business application priority such that the processing deadline is met may include inserting the business application into the ready list by a scheduler of the real time operating system (154) according to any of the previously mentioned scheduling algorithms.

In the method of FIG. 3, executing (308) the business application (126) in the SOA in accordance with the real time processing information (108) includes preempting (308) by the real time operating system processing of the business application for a higher priority process only if execution of the business application can be completed in accordance with the real time processing information. Preempting (308) processing of the business application may be carried out by determining, by the scheduler that another process has higher priority, interrupting the execution of the business application, monitoring time spent executing the higher priority process, and resuming execution of the business application such that the business application is executed in accordance with the real time processing deadline for the application.

Figure 4:
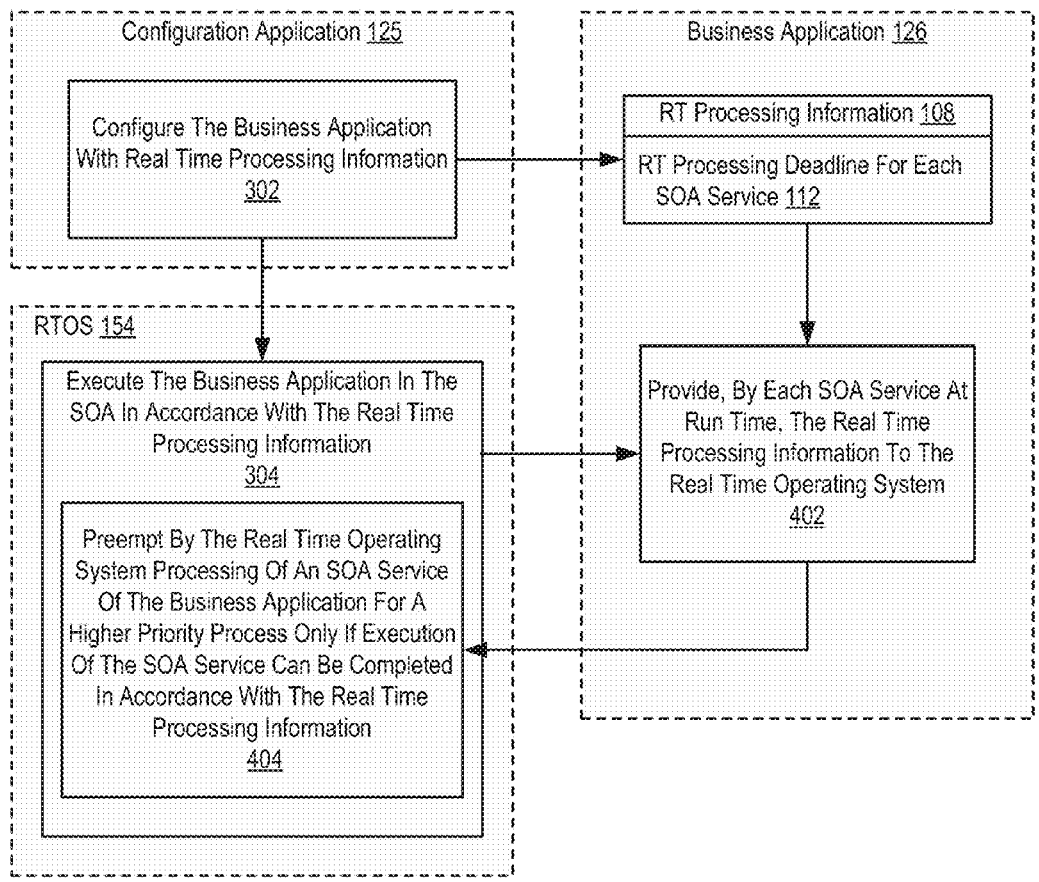
FIG. 4 sets forth a flow chart illustrating a further exemplary method for deterministic real time business application processing in an SOA according to embodiments of the present invention.

For further explanation, FIG. 4 sets forth a flow chart illustrating a further exemplary method for deterministic real time business application processing in an SOA according to embodiments of the present invention. The method of FIG. 4 is similar to the method of FIG. 3, including as it does, configuring (302) the business application (126) with real time processing information (108) and executing (304) the business application (126) in the SOA in accordance with the real time processing information (108).

The method of FIG. 4 differs from the method of FIG. 3, however, in that in the method of FIG. 4, the real time processing information (108) includes a real time processing deadline (112) for each SOA service of the business application (126). That is, each SOA service is configured with a real time processing deadline which when met for each service effectively insures real time execution of the business application.

The method of FIG. 4 includes executing the business application (126) and providing (402), by each SOA service at run time, the real time processing information (108) to the real time operating system (154). Readers of skill in the art will recognize that each SOA service may be executing on different computer systems and each such computer system may run a different real time operating system (154).

In the method of FIG. 4, executing (304) the business application in the SOA in accordance with the real time processing information includes preempting (404), by the real time operating system, processing of an SOA service of the business application for a higher priority process only if execution of the SOA service can be completed in accordance with the real time processing information. Preempting (404) processing of an SOA service may be carried out by determining, by the scheduler that another process has higher priority than the service, interrupting the execution of the service, monitoring time spent executing the higher priority process, and resuming execution of the service such that the business application is executed in accordance with the real time processing deadline for the service.

Exemplary embodiments of the present invention are described largely in the context of a fully functional computer system for deterministic real time business application processing in an SOA. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of deterministic real time business application processing in a service-oriented architecture ('SOA'), the SOA comprising SOA services, each SOA service carrying out a processing step of the business application, each SOA service comprising a real time process executable on a real time operating system of a generally programmable computer, the method comprising:

configuring the business application with real time processing information, wherein the real time processing information includes a real time processing deadline for each processing step of the business application, and wherein configuring the business application with real time processing information comprises:

recording, by a configuration application, the real time processing deadline for each processing step of the business application in metadata associated with the business application;

providing, by the business application at run time, the real time processing deadline for each processing step of the business application to the real time operating system; and executing the business application in the SOA in accordance with the real time processing information wherein executing the business application in the SOA in accordance with the real time processing information further comprises preempting, by the real time operating system, processing of the business application for a higher priority process only if execution of the business application can be completed in accordance with the real time processing deadline for each processing step of the business application.

2. The method of claim 1 wherein the real time processing information includes a real time processing deadline for the business application.

3. The method of claim 1 further comprising providing, by the business application at run time, the real time processing information to the real time operating system.

4. The method of claim 1 wherein:
real time processing information includes a real time processing deadline for each SOA service of the business application; and
the method further comprises providing, by each SOA service at run time, the real time processing information to the real time operating system.

5. The method of claim 1 wherein:
the SOA is implemented with SOA services comprising interoperable web services;
the web services are described in Web Services Description Language ('WSDL') and registered in at least one Universal Description, Discovery and Integration ('UDDI') directory; and
executing the business application further comprises:
sending requests for data processing among the services including sending the requests as Simple Object Access Protocol ('SOAP') requests for real time execution of a processing step of the business application, each such request including an identification of a next type of web service to call for a next processing step of the business application; and
looking up in a UDDI directory a next type of web service for the next processing step in the business application.

6. Apparatus for deterministic real time business application processing in a service-oriented architecture ('SOA'), the SOA comprising SOA services, each SOA service carrying out a processing step of the business application, each SOA service comprising a real time process executable on a real time operating system of a generally programmable computer, the apparatus comprising a computer processor, a computer memory operatively coupled to the computer processor, the computer memory having disposed within it computer program instructions capable of:

configuring the business application with real time processing information, wherein the real time processing information includes a real time processing deadline for each processing step of the business application, and wherein configuring the business application with real time processing information comprises:

recording, by a configuration application, the real time processing deadline for each processing step of the business application in metadata associated with the business application;

providing, by the business application at run time, the real time processing deadline for each processing step of the business application to the real time operating system; and executing the business application in the SOA in accordance with the real time processing information wherein executing the business application in the SOA in accordance with the real time processing information further comprises preempting, by the real time operating system, processing of the business application for a higher priority process only if execution of the business application can be completed in accordance with the real time processing deadline for each processing step of the business application.

7. The apparatus of claim 6 wherein the real time processing information includes a real time processing deadline for the business application.

8. The apparatus of claim 6 further comprising providing, by the business application at run time, the real time processing information to the real time operating system.

9. The apparatus of claim 6 wherein:
real time processing information includes a real time processing deadline for each SOA service of the business application; and
the apparatus further comprises computer program instructions capable of providing, by each SOA service at run time, the real time processing information to the real time operating system.

10. The apparatus of claim 6 wherein:
the SOA is implemented with SOA services comprising interoperable web services;
the web services are described in Web Services Description Language ('WSDL') and registered in at least one Universal Description, Discovery and Integration ('UDDI') directory; and
executing the business application further comprises:
sending requests for data processing among the services including sending the requests as Simple Object Access Protocol ('SOAP') requests for real time execution of a processing step of the business application, each such request including an identification of a next type of web service to call for a next processing step of the business application; and
looking up in a UDDI directory a next type of web service for the next processing step in the business application.

11. A computer program product for deterministic real time business application processing in a service-oriented architecture ('SOA'), the SOA comprising SOA services, each SOA service carrying out a processing step of the business application, each SOA service comprising a real time process executable on a real time operating system of a generally programmable computer, the computer program product disposed in a non-transitory computer readable medium, the computer program product comprising computer program instructions capable of:

configuring the business application with real time processing information, wherein real time processing information includes a real time processing deadline for each processing step of the business application, and wherein configuring the business application with real time processing information comprises:

recording, by a configuration application, the real time processing deadline for each processing step of the business application in metadata associated with the business application;

providing, by the business application at run time, the real time processing deadline for each processing step of the business application to the real time operating system; and executing the business application in the SOA in accordance with the real time processing information wherein executing the business application in the SOA in accordance with the real time processing information further comprises preempting, by the real time operating system, processing of the business application for a higher priority process only if execution of the business application can be completed in accordance with the real time processing deadline for each processing step of the business application.

12. The computer program product of claim 11 wherein the real time processing information includes a real time processing deadline for the business application.

13. The computer program product of claim 11 further comprising providing, by the business application at run time, the real time processing information to the real time operating system.

\* \* \* \* \*